United States Patent
Patil et al.

(10) Patent No.: US 9,697,593 B2
(45) Date of Patent: Jul. 4, 2017

(54) SYSTEM AND METHOD FOR TONE MAPPING ON HIGH DYNAMIC RANGE IMAGES

(71) Applicant: ITTIAM SYSTEMS (P) LTD., Bangalore (IN)

(72) Inventors: Arun Kumar Patil, Bangalore (IN); Tharun Battula, Karimnagar (IN); Preethi Konda, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 68 days.

(21) Appl. No.: 14/165,577

(22) Filed: Jan. 28, 2014

(65) Prior Publication Data
US 2015/0213618 A1    Jul. 30, 2015

(51) Int. Cl.
G06K 9/00    (2006.01)
G06T 5/40    (2006.01)
G06T 5/00    (2006.01)

(52) U.S. Cl.
CPC .............. G06T 5/40 (2013.01); G06T 5/009 (2013.01); G06T 2207/10016 (2013.01); G06T 2207/10144 (2013.01); G06T 2207/20208 (2013.01)

(58) Field of Classification Search
None
See application file for complete search history.

(56) References Cited

U.S. PATENT DOCUMENTS

| | | | | |
|---|---|---|---|---|
| 2004/0184766 A1* | 9/2004 | Kim | ....................... | G11B 20/10 386/328 |
| 2005/0013477 A1* | 1/2005 | Ratti et al. | .................... | 382/154 |
| 2005/0275747 A1* | 12/2005 | Nayar et al. | .................. | 348/362 |
| 2005/0276441 A1* | 12/2005 | Debevec | ....................... | 382/100 |
| 2006/0008141 A1* | 1/2006 | Lin et al. | ....................... | 382/167 |
| 2006/0082689 A1* | 4/2006 | Moldvai | ....................... | 348/678 |
| 2008/0069445 A1* | 3/2008 | Weber | ....................... | 382/181 |
| 2009/0257679 A1* | 10/2009 | Hogasten | ....................... | 382/275 |
| 2009/0268062 A1* | 10/2009 | Matsushita et al. | .......... | 348/241 |
| 2012/0074294 A1* | 3/2012 | Streuber | .................... | G01J 9/00 250/201.9 |
| 2014/0300608 A1* | 10/2014 | Patil et al. | ..................... | 345/442 |
| 2015/0078661 A1* | 3/2015 | Granados et al. | ............ | 382/167 |

OTHER PUBLICATIONS

Laurence Meylan, tone mapping for high dynamic range image, shttp://infoscience.epfl.ch/record/86005, 2006.*

Paul E. Debevec, Jitendra Malik, Recovering high dynamic range radiance maps from photographs, Proceedings of the 24th annual conference on Computer graphics and interactive techniques, p. 369-378, Aug. 1997.*

Duan et al, Tone-mapping high dynamic range images by novel histogram adjustment, Pattern Recognition 43 (2010) 1847-1862.*

M.D. Grossberg and S.K. Nayar, "High Dynamic Range from Multiple Images: Which Exposures to Combine,?", ICCV Workshop on Color and Photometric Methods in Computer Vision (CPMCV), Oct. 2003.*

* cited by examiner

Primary Examiner — Andrae S Allison
(74) Attorney, Agent, or Firm — Prakash Nama; Global IP Services, PLLC (57) ABSTRACT

A system and method for tone mapping on a high dynamic range (HDR) image of a scene are disclosed. In one embodiment, tone mapping on the HDR image is performed using a set of bit-depths, that corresponds to a plurality of images of the scene, obtained at each unit of an irradiance range of the scene.

21 Claims, 7 Drawing Sheets

SYSTEM AND METHOD FOR TONE MAPPING ON HIGH DYNAMIC RANGE IMAGES

TECHNICAL FIELD

Embodiments of the present subject matter relate to image processing. More particularly, embodiments of the present subject matter relate to tone mapping on high dynamic range (HDR) images.

BACKGROUND

Generally, a plurality of images of a scene having one or more exposure values are combined to generate a high dynamic range (HDR) image of the scene. Further, HDR image data is encoded from the HDR image and then displayed on display devices. However, most of the display devices cannot display the HDR image data as the HDR image data has a very wide dynamic range compared to a dynamic range of the display devices. Thus, in order to display the HDR image data, the dynamic range of the HDR image data needs to be mapped with the dynamic range of the display devices. Tone mapping is a technique used to map the dynamic range of the HDR image data with the dynamic range of the display devices. Existing techniques for performing tone mapping on the HDR image generate a tone mapping curve by assuming a certain bit-depth or granularity for irradiance information of the scene. These techniques then map the dynamic range of the HDR image data with the dynamic range of the display devices using the generated tone mapping curve. However, the assumption taken by these techniques, to generate the tone mapping curve, may lead to posterization or result in inefficient use of available display levels for satisfactory representation of the dynamic range of the HDR image data. Further, the ill effects of this assumption are severe when the images used for generating the HDR image are less in number. Using a high number of images for HDR image generation may lead to higher capture time and may further require a higher processing power. Therefore, making it unsuitable for a device like a camera phone. In addition to getting image details in all the irradiance ranges of the scene, the tone mapped HDR image is often expected to appear dramatic and hence have richer details and vivid colors than any of the plurality of images. Generally, this is achieved by enhancing edges and boosting colors which can cause distortions in the image and hence undesirable.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for tone mapping on high dynamic range (HDR) images are disclosed. In the following detailed description of the embodiments of the present subject matter, references are made to the accompanying drawings that form a part hereof, and in which are shown by way of illustration specific embodiments in which the present subject matter be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
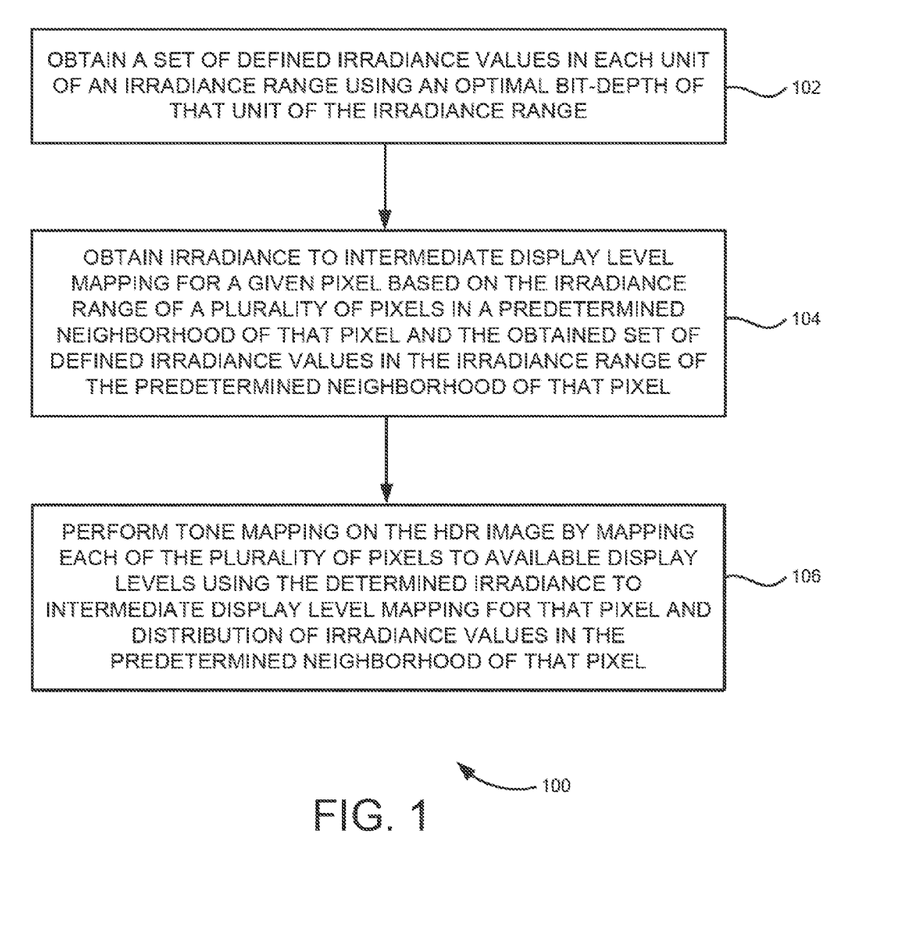
FIG. 1 illustrates a flowchart of a method for tone mapping on a high dynamic range (HDR) image, according to one embodiment.

FIG. 1 illustrates a flowchart 100 of a method for tone mapping on a HDR image, according to one embodiment. In one embodiment, tone mapping is performed on the HDR image of a scene using a set of bit-depths obtained at each unit of an irradiance range of the scene. For example, the set of bit-depths corresponds to a plurality of images of the scene. In this example, the plurality of images includes a plurality of exposure bracketed images, of the scene, used for generating the HDR image. In one example embodiment, a darkest image of the exposure bracketed images have an exposure value of one unit and one to one mapping to a pixel intensity value. This indicates that the additional bit-depth at each unit of the irradiance range as obtained by mapping the pixel intensity levels of the dark image to the irradiance levels is zero. Therefore, irradiance information of the scene is defined only at integer irradiance values. Further, exposure values of other images of the exposure bracketed images are determined with respect to the exposure value of the darkest image. In one example, pixel value to irradiance value mapping curves of the other images are obtained using a pixel value to irradiance value mapping curve of the darkest image and associated exposure value. This is explained in more detail with reference to FIG. 2.

In one example embodiment, at block 102, a set of defined irradiance values in each unit of the irradiance range is obtained using an optimal bit-depth of that unit of the irradiance range. In one embodiment, the optimal bit-depth at each unit of the irradiance range of the scene is determined using the set of bit-depths obtained at that unit of the irradiance range. In one example, the optimal bit-depth at a given unit of the irradiance range is determined as a highest bit-depth among the set of bit-depths obtained at that unit of the irradiance range. This is explained in more detail with reference to FIG. 3. In another example, irradiance values defined by each of the set of bit-depths are obtained in each unit of the irradiance range. The optimal bit depth at each unit of the irradiance range is then determined as an effective bit-depth obtained using all the irradiance values defined by the set of bit-depths in that unit of the irradiance range. This is explained in more detail with reference to FIG. 4. Further in this embodiment, the set of defined irradiance values in each unit of the irradiance range is obtained using the optimal bit-depth of that unit of the irradiance range.

Figure 5A:
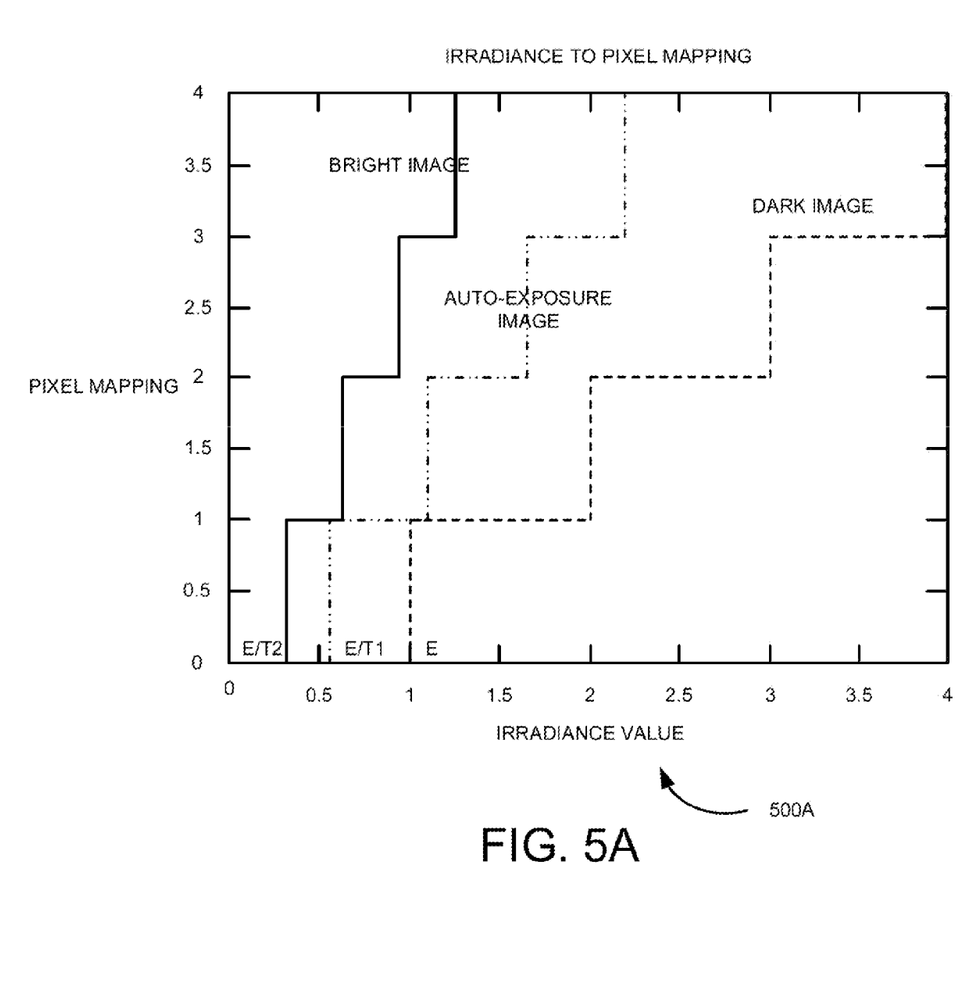
FIGS. 5A-5B are graphs illustrating irradiance to intermediate display level mappings, according to one embodiment.
Figure 5B:
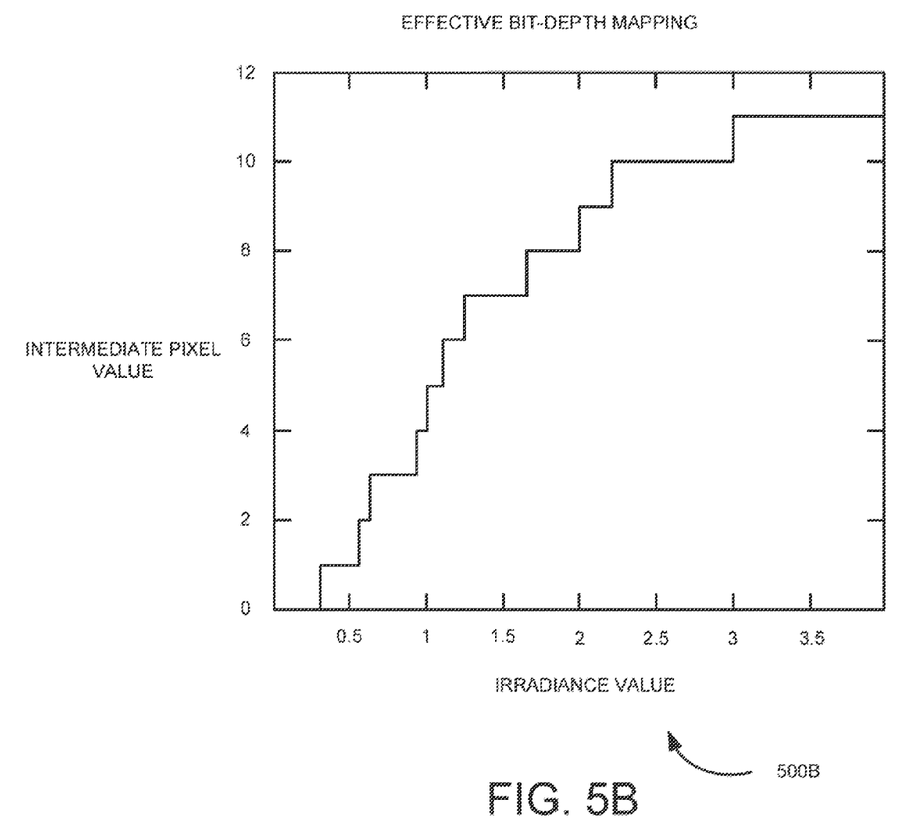

At block 104, irradiance to intermediate display level mapping for a given pixel in the HDR image is obtained based on the irradiance range of a plurality of pixels in a predetermined neighborhood of that pixel and the obtained set of defined irradiance values in the irradiance range of the predetermined neighborhood of that pixel. In one example embodiment, the irradiance to intermediate display level mapping for a given irradiance range is obtained by mapping each successive irradiance value in the set of defined irradiance values in each unit of the irradiance range to consecutive intermediate display level, as shown in graphs 500A and 500E of FIGS. 5A-5B.

At block 106, tone mapping is performed on the HDR image by mapping each of the plurality of pixels to available display level using the determined irradiance to intermediate display level mapping for that pixel and distribution of the irradiance values in the predetermined neighborhood of that pixel. In one example embodiment, tone mapping on the HDR image is performed using the determined irradiance to intermediate display level mapping, for that pixel, when the number of intermediate display levels required to map the irradiance range of the predetermined neighborhood of that pixel as determined by the irradiance to intermediate display level mapping for that pixel does not exceed a number of available display levels. For example, the predetermined neighborhood for a given pixel is a rectangular region of a size equal to half an image width and height.

In another example embodiment, for the given pixel, the intermediate display level to available display level mapping is obtained by performing contrast limited histogram equalization over the irradiance range of the plurality of pixels in the predetermined neighborhood of that pixel when the number of intermediate display levels required to map the irradiance range of the predetermined neighborhood of that pixel as determined by the irradiance to intermediate display level mapping for that pixel exceed the number of available display levels. In this example embodiment, a histogram of the mapped pixel values is obtained from the predetermined neighborhood of pixels for each of the plurality of pixels. To perform contrast limited histogram equalization, a clip value is determined for a bin count of each bin in the histogram. For example, each bin in the histogram corresponds to an intermediate display level. Each bin with bin count exceeding the clip value is clipped and the excess bin count is accumulated. The accumulated excess bin count is distributed to the bins of the histogram such that no bin count exceeds the determined clip value. The clip value for the bin count may be calculated using an equation:

$$f(j) \le [1] * \frac{(N)}{(DisplayMax - DisplayMin)}$$

where j is the bin number in the histogram, N is a number of pixels in the predetermined neighbourhood of the given pixel, DisplayMax is the maximum allowed display level and DisplayMin is the minimum allowed display level.

In addition, the mapping of intermediate display levels to the available display levels may be performed using an equation:

$$Display[i] = DisplayMin + \frac{(DisplayMax - DisplayMin)}{N} * \sum_{k=0}^{i} f(i)$$

Figure 2:
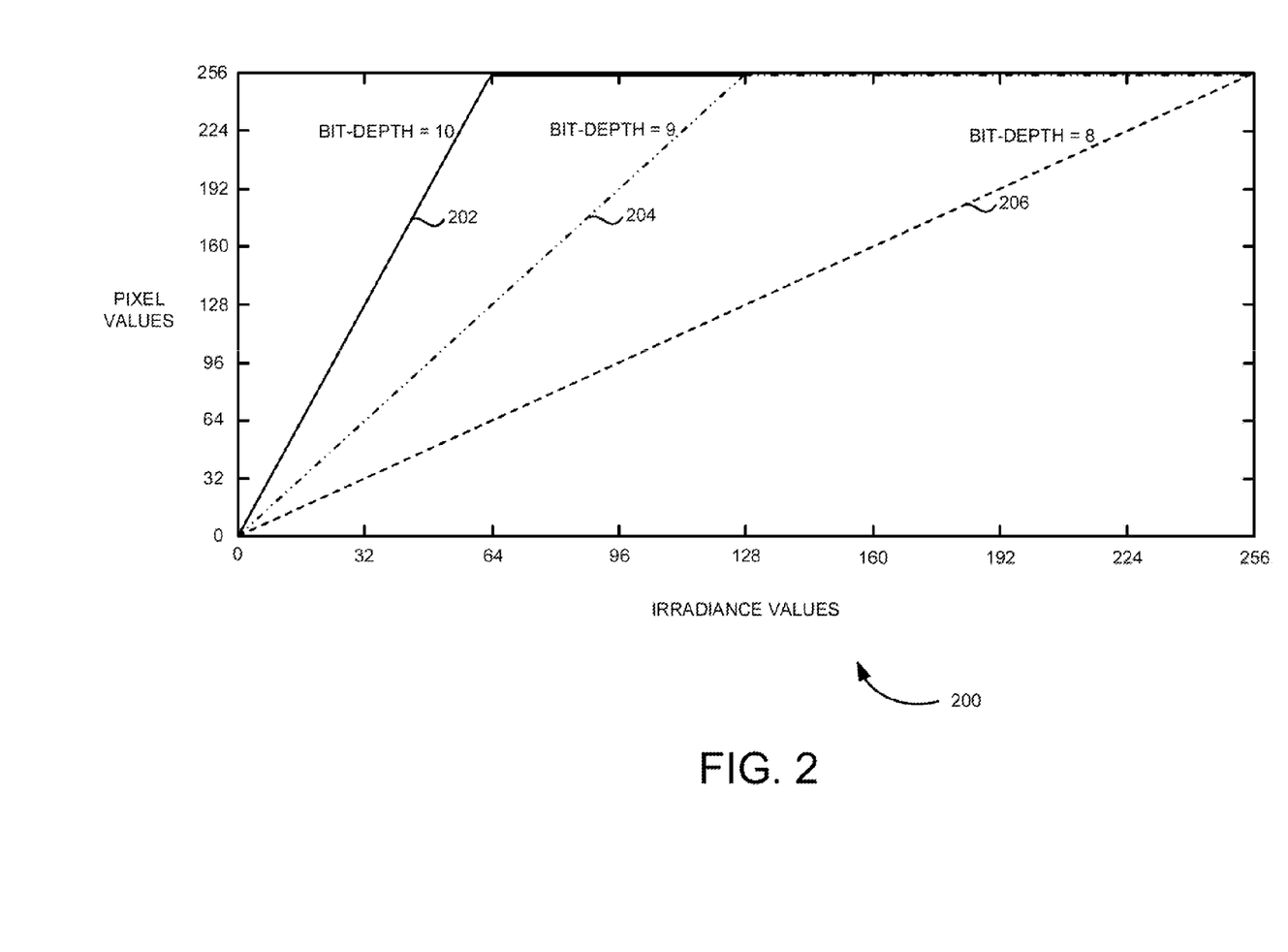
FIG. 2 is a graph illustrating pixel value to irradiance value mapping curves of a plurality of exposure bracketed images with various exposure values, according to one embodiment.

Referring now to FIG. 2, which is a graph 200 illustrating pixel value to irradiance value mapping curves 202, 204, and 206 of a plurality of exposure bracketed images with exposure values of 1, 2 and 4, according to one embodiment. For example, the exposure bracketed images are used to generate the HDR image. In the graph 200, x-axis indicates irradiance values and y-axis indicates pixel values. Further in the graph 200, the pixel value to irradiance value mapping curve 202 represents the darkest image of the scene having the exposure value of 1 and is same as a scaled camera response curve of the scene. As shown in FIG. 2, it is indicated that the entire irradiance range of the scene ranging from 0 to 255 has one-to-one mapping to the pixel intensity values for the darkest image. Therefore, the additional bit-depth obtained at any unit irradiance range as obtained by mapping the pixel intensity levels of the darkest image to irradiance values for the irradiance range of 0 to 255 is 8.

Furthermore, the pixel value to irradiance value mapping curve 204 represents an auto-exposure image of the scene. As shown in FIG. 2, the exposure value of the auto-exposure image with respect to the dark image is 2. Therefore, the additional bit-depth at each unit of irradiance value in the irradiance range of 0 to 128 is 9 after which all the irradiance values are mapped to the pixel intensity values of 255. In addition, the pixel value to irradiance value mapping curve 206 represents a brightest image of the scene. As shown in FIG. 2, the irradiance value in the irradiance range of 0 to 128 is defined at every 0.5 unit of the irradiance by the auto exposure image. Similarly, the additional bit-depth obtained from the brightest image at each unit of the irradiance value in the range 0 to 64 is 10. Therefore, the irradiance range is defined at every 0.25 units of the irradiance by the brightest image.

Figure 3:
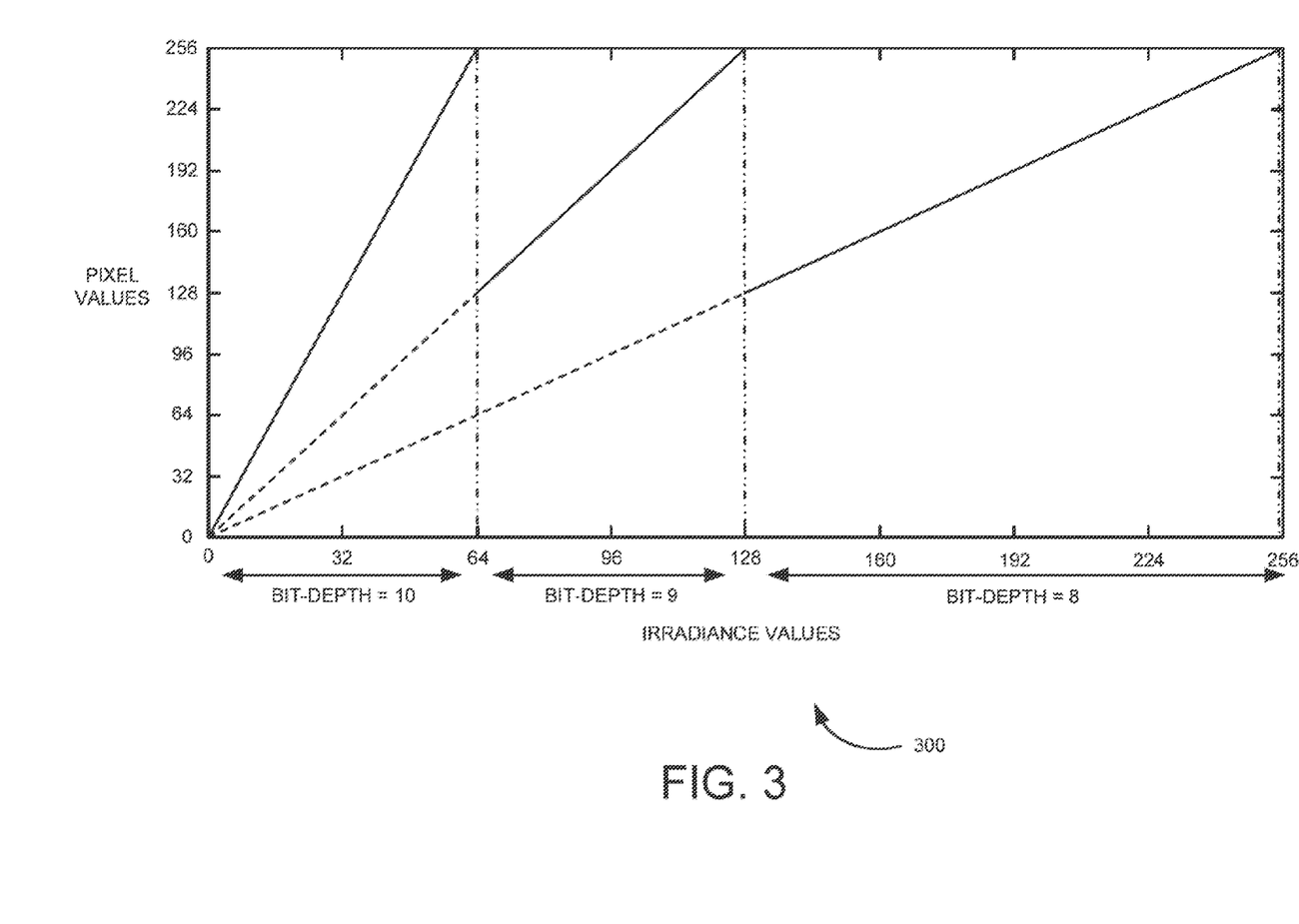
FIG. 3 is a graph illustrating obtaining an optimal bit-depth using a set of bit-depths at each unit of an irradiance range of a scene, according to one embodiment.

Referring now to FIG. 3, which is a graph 300 illustrating obtaining an optimal bit-depth using the set of bit-depths at each unit of the irradiance range of the scene, according to one embodiment. In the graph 300, x-axis indicates irradiance values and y-axis indicates pixel values. Further in the graph 300, the highest bit-depths at irradiance ranges 0 to 64, 64 to 128 and 128 to 256 are 10, 9 and 8. In one embodiment, the optimal bit-depth at each unit of the irradiance range is determined as the highest bit-depth among the set of bit-depths at that unit of the irradiance range. Therefore, the optimal bit-depths at irradiance ranges 0 to 64, 64 to 128 and 128 to 256 are considered as 10, 9 and 8, which are the highest bit-depths in the respective irradiance range. Using the determined optimal bit-depth for tone mapping on the HDR image results in tone mapped HDR image with contrast similar to that of constituent images and thus gives natural looking HDR image.

Figure 4:
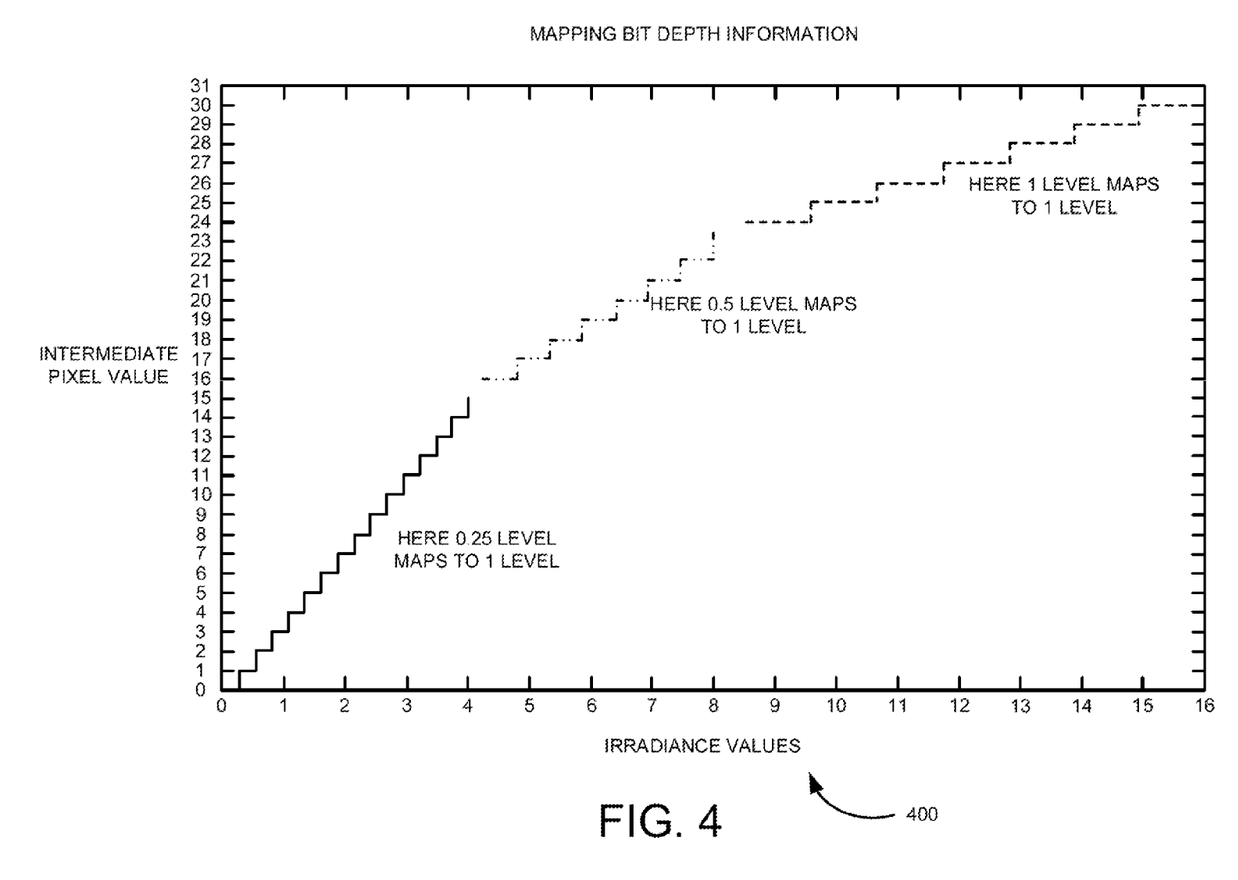
FIG. 4 is another graph illustrating obtaining the optimal bit-depth using the set of bit-depths at each unit of the irradiance range of the scene, according to one embodiment.

Referring now to FIG. 4, which is another graph 400 illustrating obtaining the optimal bit-depth using the set of bit-depths at each unit of the irradiance range of the scene, according to one embodiment. In the graph 400, x-axis indicates the irradiance values and y-axis indicates intermediate pixel values. In one embodiment, irradiance values defined by each of the set of bit-depths are obtained in each unit of the irradiance range. Further, as shown in the graph 400, the optimal bit depth at each unit of the irradiance range is determined as the effective bit-depth obtained using all the irradiance values defined by the obtained set of bit-depths in that unit of the irradiance range. Since the effective bit-depth is often higher than any of the individual bit-depths, the resultant tone mapped HDR image has higher contrast than any of the constituent images and thus gives a dramatic effect to the tone mapped HDR image without causing any distortions.

Figure 6:
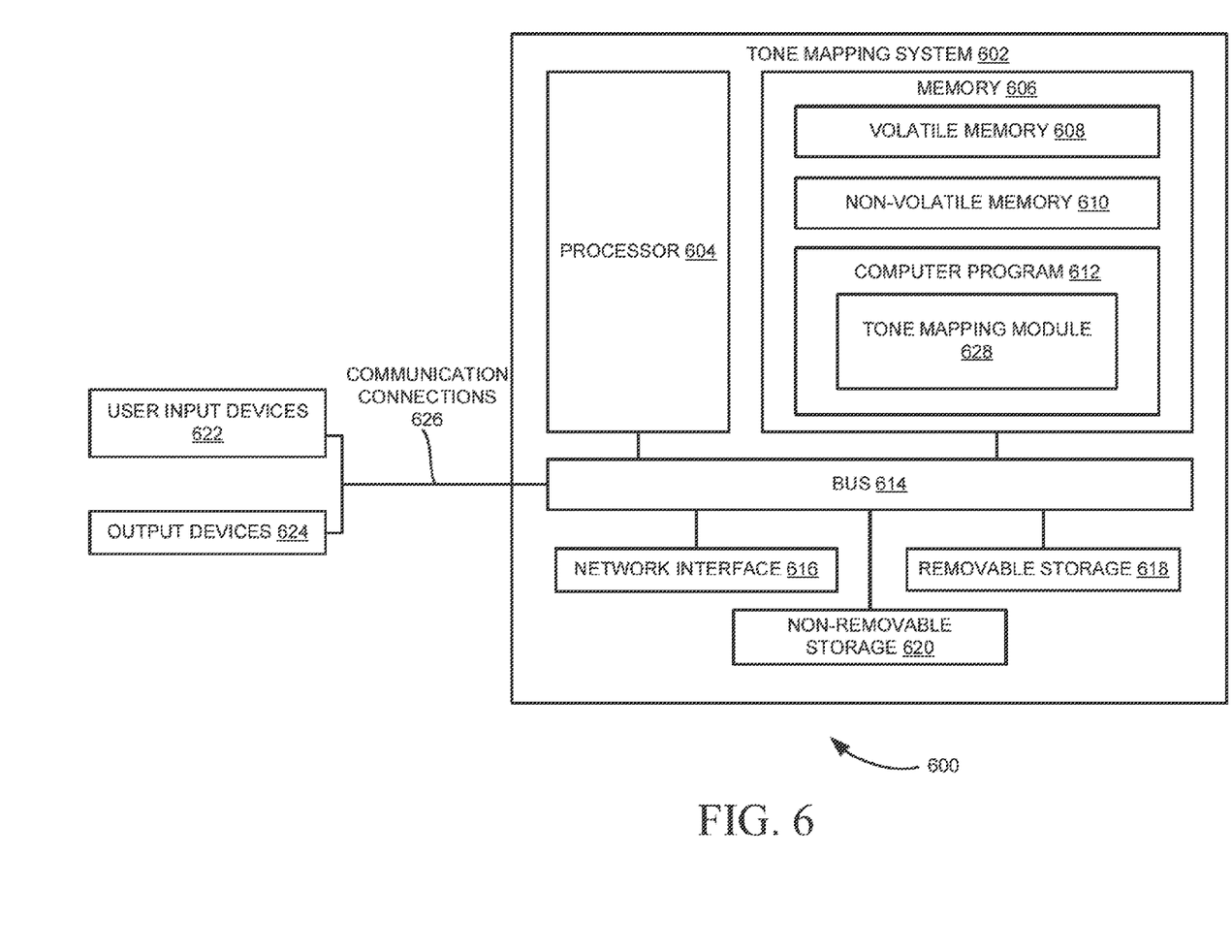
FIG. 6 illustrates a tone mapping system for tone mapping on the HDR image, using the process of FIG. 1, according to one embodiment.

Referring now to FIG. 6, which illustrates a tone mapping system 602 for tone mapping on the HDR image, using the process of FIG. 1, according to one embodiment. FIG. 6 and the following discussions are intended to provide a brief, general description of a suitable computing environment in which certain embodiments of the inventive concepts contained herein are implemented.

The tone mapping system 602 includes a processor 604, memory 606, a removable storage 618, and a non-removable storage 620. The tone mapping system 602 additionally includes a bus 614 and a network interface 616. As shown in FIG. 6, the tone mapping system 602 includes access to the computing system environment 600 that includes one or more user input devices 622, one or more output devices 624, and one or more communication connections 626 such as a network interface card and/or a universal serial bus connection.

Exemplary user input devices 622 include a digitizer screen, a stylus, a trackball, a keyboard, a keypad, a mouse and the like. Exemplary output devices 624 include a display unit of the personal computer, a mobile device, and the like. Exemplary communication connections 626 include a local area network, a wide area network, and/or other network.

The memory 606 further includes volatile memory 608 and non-volatile memory 610. A variety of computer-readable storage media are stored in and accessed from the memory elements of the tone mapping system 602, such as the volatile memory 608 and the non-volatile memory 610, the removable storage 618 and the non-removable storage 620. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the tone mapping system 602. For example, a computer program 612 includes machine-readable instructions capable for generating the HDR image of a scene, according to the teachings and herein described embodiments of the present subject matter. In one embodiment, the computer program 612 is included on a compact disk-read only memory (CD-ROM) and loaded from the CD-ROM to a hard drive in the non-volatile memory 610. The machine-readable instructions cause the tone mapping system 602 to encode according to the various embodiments of the present subject matter.

As shown, the computer program 612 includes a tone mapping module 628. For example, the tone mapping module 628 can be in the form of instructions stored on a non-transitory computer-readable storage medium. The non-transitory computer-readable storage medium having the instructions that, when executed by the tone mapping system 602, causes the tone mapping system 602 to perform the method described in FIG. 1.

In one embodiment, the tone mapping module 628 performs tone mapping on the HDR image of the scene using a set of bit-depths obtained at each unit of an irradiance range of the scene. For example, the set of bit-depths corresponds to a plurality of images of the scene. In this example, the plurality of images includes a plurality of exposure bracketed images, of the scene, used to generate the HDR image. In one example embodiment, a darkest image of the exposure bracketed images have an exposure value of one unit and a one to one mapping to a pixel intensity value. This indicates that the bit-depth at each unit of the irradiance range as obtained from the dark image is zero. Therefore, irradiance information of the scene is defined only at integer irradiance values. Further, exposure values of other images of the exposure bracketed images are determined with respect to the exposure value of the darkest image. In one example, pixel value to irradiance value mapping curves of the other images are obtained using a pixel value to irradiance value mapping curve of the darkest image and associated exposure value. This is explained in more detail with reference to FIG. 2.

In one example embodiment, the tone mapping module 628 obtains a set of defined irradiance values in each unit of the irradiance range using an optimal bit-depth determined using the set of bit-depths at that unit of the irradiance range. Further, the tone mapping module 628 obtains irradiance to intermediate display level mapping for a given pixel in the HDR image based on the irradiance range of a plurality of pixels in a predetermined neighborhood of that pixel and the obtained set of defined irradiance values in the irradiance range of the predetermined neighborhood of that pixel. Furthermore, tone mapping module 628 performs tone mapping on the HDR image by mapping each of the plurality of pixels to available display level using the determined irradiance to intermediate display level mapping for that pixel and distribution of the irradiance values in the predetermined neighborhood of that pixel. This is explained in more detailed with reference to FIG. 1.

In various embodiments, the systems and methods described in FIGS. 1 through 6 propose a technique for performing tone mapping on the HDR image using a set of bit-depths obtained at each unit of an irradiance range of a scene. For example, the set of bit-depths corresponds to a plurality of exposure bracketed images of the scene used for generating the HDR image. The proposed technique efficiently uses the available pixel values for satisfactory representation of the full irradiance values of the scene and also prevents posterization.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
performing tone mapping on a high dynamic range (HDR) image using a set of bit-depths obtained at each unit of an irradiance range of a scene, wherein the set of bit-depths corresponds to a plurality of images of the scene, wherein performing tone mapping on the HDR image using the set of bit-depths obtained at each unit of the irradiance range of the scene, comprises:
  obtaining a set of defined irradiance values in each unit of the irradiance range using a bit-depth determined using the set of bit-depths at that unit of the irradiance range;
  obtaining irradiance to intermediate display level mapping for a given pixel based on the irradiance range of a plurality of pixels in a predetermined neighborhood of that pixel and the obtained set of defined irradiance values in the irradiance range of the predetermined neighborhood of that pixel; and
  performing tone mapping on the HDR image by mapping each of the plurality of pixels to available display levels using the determined irradiance to intermediate display level mapping for that pixel and distribution of irradiance values in the predetermined neighborhood of that pixel, wherein the tone mapping is performed on the HDR image to map pixel values in different irradiance ranges of the HDR image to a dynamic range of a display device and prevent posterization.

2. The method of claim 1, wherein obtaining the irradiance to intermediate display level mapping for the given pixel, comprises:
  obtaining the irradiance to intermediate display level mapping, for a given irradiance range, by mapping each successive irradiance value in the obtained set of defined irradiance values in each unit of the irradiance range to a consecutive intermediate display level.

3. The method of claim 1, wherein obtaining the set of defined irradiance values in each unit of the irradiance range using the bit-depth determined using the set of bit-depths at that unit of the irradiance range, comprises:
  determining the bit-depth for each unit of the irradiance range of the scene using the set of bit-depths at that unit of the irradiance range; and
  obtaining the set of defined irradiance values in each unit of the irradiance range using the determined bit-depth of that unit of the irradiance range.

4. The method of claim 3, wherein determining the bit-depth for each unit of the irradiance range of the scene using the set of bit-depths at that unit of the irradiance range, comprises:
  determining the bit-depth at each unit of the irradiance range as a highest bit-depth among the set of bit-depths at that unit of the irradiance range.

5. The method of claim 3, wherein determining the bit-depth for each unit of the irradiance range of the scene using the set of bit-depths at that unit of the irradiance range, comprises:
  obtaining irradiance values defined by the set of bit-depths obtained in each unit of the irradiance range; and
  determining the bit depth at each unit of the irradiance range as an effective bit-depth obtained using the irradiance values defined by the obtained set of bit-depths in that unit of the irradiance range.

6. The method of claim 1, wherein performing the tone mapping on the HDR image by mapping each of the plurality of pixels to the available display levels using the determined irradiance to intermediate display level mapping for that pixel and the distribution of the irradiance values in the predetermined neighborhood of that pixel, comprises:
  performing the tone mapping on the HDR image using the determined irradiance to intermediate display level mapping for that pixel when the number of intermediate display levels required to map the irradiance range of the predetermined neighborhood of that pixel as determined by the irradiance to intermediate display level mapping for that pixel does not exceed a number of available display levels.

7. The method of claim 6, further comprising:
  obtaining the intermediate display level to available display level mapping, for the given pixel, by performing contrast limited histogram equalization over the irradiance range of the pixels in the predetermined neighborhood of that pixel when the number of intermediate display levels required to man the irradiance range of the predetermined neighborhood of that pixel as determined by the irradiance to intermediate display level mapping for that pixel exceed the number of available display levels.

8. A tone mapping system, comprising:
a processor; and
memory coupled to the processor, wherein the memory includes a tone mapping module to:
perform tone mapping on a high dynamic range (HDR) image using a set of bit-depths obtained at each unit of an irradiance range of a scene, wherein the set of bit-depths corresponds to a plurality of images of the scene, wherein the tone mapping module is configured to:
  obtain a set of defined irradiance values in each unit of the irradiance range using a bit-depth determined using the set of bit-depths at that unit of the irradiance range;
  obtain irradiance to intermediate display level mapping for a given pixel based on the irradiance range of a plurality of pixels in a predetermined neighborhood of that pixel and the obtained set of defined irradiance values in the irradiance range of the predetermined neighborhood of that pixel; and
  perform tone mapping on the HDR image by mapping each of the plurality of pixels to available display levels using the determined irradiance to intermediate display level mapping for that pixel and distribution of irradiance values in the predetermined neighborhood of that pixel, wherein the tone mapping is performed on the HDR image to map pixel values in different irradiance ranges of the HDR image to a dynamic range of a display device and prevent posterization.

9. The system of claim 8, wherein the tone mapping module is configured to:
  obtain the irradiance to intermediate display level mapping, for a given irradiance range, by mapping each successive irradiance value in the obtained set of defined irradiance values in each unit of the irradiance range to a consecutive intermediate display level.

10. The system of claim 8, wherein the tone mapping module is configured to:
  determine the bit-depth for each unit of the irradiance range of the scene using the set of bit-depths at that unit of the irradiance range, and obtain the set of defined irradiance values in each unit of the irradiance range using the determined bit-depth of that unit of the irradiance range.

11. The system of claim 10, wherein the tone mapping module is configured to:
    determine the bit-depth at each unit of the irradiance range as a highest bit-depth among the set of bit-depths at that unit of the irradiance range.

12. The system of claim 10, wherein the tone mapping module is configured to:
    obtain irradiance values defined by the set of bit-depths obtained in each unit of the irradiance range; and
    determine the bit depth at each unit of the irradiance range as an effective bit-depth obtained using the irradiance values defined by the set of bit-depths in that unit of the irradiance range.

13. The system of claim 8, wherein the tone mapping module is configured to:
    perform the tone mapping on the HDR image using the determined irradiance to intermediate display level mapping for that pixel when the number of intermediate display levels required to map the irradiance range of the predetermined neighborhood of that pixel as determined by the irradiance to intermediate display level mapping for that pixel does not exceed a number of available display levels.

14. The system of claim 13, wherein the tone mapping module is further configured to:
    obtain the intermediate display level to available display level mapping, for the given pixel, by performing contrast limited histogram equalization over the irradiance range of the pixels in the predetermined neighborhood of that pixel when the number of intermediate display levels required to map the irradiance range of the predetermined neighborhood of that pixel as determined by the irradiance to intermediate display level mapping for that pixel exceed the number of available display levels.

15. A non-transitory computer-readable storage medium having instructions that when executed by a computing device, cause the computing device to:
    perform tone mapping on a high dynamic range (HDR) image using a set of bit-depths obtained at each unit of an irradiance range of a scene, wherein the set of bit-depths corresponds to a plurality of images of the scene, wherein the instructions cause the computing device to:
        obtain a set of defined irradiance values in each unit of the irradiance range using a bit-depth determined using the set of bit-depths at that unit of the irradiance range;
        obtain irradiance to intermediate display level mapping for a given pixel based on the irradiance range of a plurality of pixels in a predetermined neighborhood of that pixel and the obtained set of defined irradiance values in the irradiance range of the predetermined neighborhood of that pixel; and
        perform tone mapping on the HDR image by mapping each of the plurality of pixels to available display levels using the determined irradiance to intermediate display level mapping for that pixel and distribution of irradiance values in the predetermined neighborhood of that pixel, wherein the tone mapping is performed on the HDR image to map pixel values in different irradiance ranges of the HDR image to a dynamic range of a display device and prevent posterization.

16. The non-transitory computer-readable storage medium of claim 15, wherein the instructions cause the computing device to:
    obtain the irradiance to intermediate display level mapping, for a given irradiance range, by mapping each successive irradiance value in the obtained set of defined irradiance values in each unit of the irradiance range to a consecutive intermediate display level.

17. The non-transitory computer-readable storage medium of claim 15, wherein the instructions cause the computing device to:
    determine the bit-depth for each unit of the irradiance range of the scene using the set of bit-depths at that unit of the irradiance range; and
    obtain the set of defined irradiance values in each unit of the irradiance range using the determined bit-depth of that unit of the irradiance range.

18. The non-transitory computer-readable storage medium of claim 17, wherein the instructions cause the computing device to:
    determine the bit-depth at each unit of the irradiance range as a highest bit-depth among the set of bit-depths at that unit of the irradiance range.

19. The non-transitory computer-readable storage medium of claim 17, wherein the instructions cause the computing device to:
    obtain irradiance values defined by the set of bit-depths in each unit of the irradiance range; and
    determine the bit depth at each unit of the irradiance range as an effective bit-depth obtained using the irradiance values defined by the obtained set of bit-depths in that unit of the irradiance range.

20. The non-transitory computer-readable storage medium of claim 15, wherein the instructions cause the computing device to:
    perform the tone mapping on the HDR image using the determined irradiance to intermediate display level mapping for that pixel when the number of intermediate display levels required to map the irradiance range of the predetermined neighborhood of that pixel as determined by the irradiance to intermediate display level mapping for that pixel does not exceed a number of available display levels.

21. The non-transitory computer-readable storage medium of claim 20, wherein the instructions further cause the computing device to:
    obtain the intermediate display level to available display level mapping, for the given pixel, by performing contrast limited histogram equalization over the irradiance range of the pixels in the predetermined neighborhood of that pixel when the number of intermediate display levels required to map the irradiance range of the predetermined neighborhood of that pixel as determined by the irradiance to intermediate display level mapping for that pixel exceed the number of available display levels.

* * * * *